United States Patent [19]

Yamaki et al.

[11] 4,371,940
[45] Feb. 1, 1983

[54] NAVIGATION INSTRUMENT

[75] Inventors: Kiyoshi Yamaki, Yokohama; Masanori Mizote; Hitoshi Takeda, both of Yokosuka; Hidetaka Suzuki, Yokohama; Hiroyuki Nomura, Fujisawa; Teruo Kawasaki; Kazuyuki Mori, both of Yokohama, all of Japan

[73] Assignee: Nissan Motor Co., Ltd., Kanagawa, Japan

[21] Appl. No.: 288,453

[22] Filed: Jul. 30, 1981

Related U.S. Application Data

[63] Continuation of Ser. No. 158,822, Jun. 12, 1980, abandoned.

[30] Foreign Application Priority Data

Jun. 14, 1979 [JP] Japan .................................. 54-75457

[51] Int. Cl.³ ...................... G01C 21/20; G01C 23/00
[52] U.S. Cl. .................................... 364/444; 364/424; 364/561; 364/569; 235/92 DN; 235/92 T
[58] Field of Search .............. 364/424, 444, 460, 446, 364/561, 565, 569, 436; 235/92 DN, 92 FQ, 92 T; 324/160, 166, 178

[56] References Cited

U.S. PATENT DOCUMENTS

| 3,106,636 | 10/1963 | McIntyre et al. | 364/704 |
|---|---|---|---|
| 3,350,382 | 9/1970 | Liston et al. | 364/565 |
| 3,748,580 | 7/1973 | Stevens et al. | 235/92 FQ |
| 3,780,272 | 12/1973 | Rohner | 364/561 |
| 3,846,701 | 11/1974 | Sampey | 235/92 FQ |
| 3,885,137 | 5/1975 | Ooya et al. | 235/92 DN |
| 3,892,952 | 7/1975 | Shibata et al. | 235/92 TF |
| 4,197,585 | 4/1980 | Moorey et al. | 235/92 DN |
| 4,216,530 | 8/1980 | Yamaki et al. | 364/444 |
| 4,242,731 | 12/1980 | Mizote et al. | 364/444 |
| 4,244,514 | 1/1981 | Nomura et al. | 235/92 DN |
| 4,250,403 | 2/1981 | Nomura et al. | 235/92 DN |

FOREIGN PATENT DOCUMENTS

| 1290051 | 9/1972 | United Kingdom . |
| 1526572 | 9/1978 | United Kingdom . |
| 2010033A | 6/1979 | United Kingdom . |
| 2011685A | 7/1979 | United Kingdom . |
| 2011686A | 7/1979 | United Kingdom . |
| 2011687A | 7/1979 | United Kingdom . |
| 2030702A | 4/1980 | United Kingdom . |

OTHER PUBLICATIONS

Karl Ludvigsen, "Cadillac's Cockpit Copilot", Oct., 1977, vol. 29, No. 10, pp. 106–107.

Primary Examiner—Gary Chin
Attorney, Agent, or Firm—Lowe, King, Price & Becker

[57] ABSTRACT

A navigation instrument for use with a roadway vehicle comprises an arithmetic means producing three data signals showing the average speed of the vehicle, the deviation of the travelling distance from a scheduled one, and the deviation of the travelling time from a scheduled one, and a display means for displaying the three data sequentially fed from the arithmetic means through a signal selector means. The arithmetic means includes travelling distance/time deviation accumulating means for adding the deviation of the travelling distance/time with respect to the average speed initially set to the deviations of the travelling distance/time whenever the average speed is altered. Thus, the navigation instrument of the present invention makes it possible to calculate and display the travelling distance/time deviation accumulated value when the average speed of the vehicle is altered on the way of vehicle travelling.

20 Claims, 5 Drawing Figures ly/>
NAVIGATION INSTRUMENT

This is a continuation, of application Ser. No. 158,822, filed June 12, 1980 now abandoned.

BACKGROUND OF THE INVENTION

The present invention relates to a navigation instrument for use with road way vehicles such as rally cars, autobuses and trucks operated on a regular run, etc.

Navigation instrument have been incorporated in road way vehicle for calculating and displaying vehicle running conditions with respect to scheduled ones so that the driver can arrive at the destination on time.

For better understanding of the navigation instrument, its principle will be described in more detail.

Assuming now that T denotes a running time, X a running distance, and Vs a running average vehicle speed, following relation is obtained:

$$T = X/Vs$$

From the above equation, the running deviation distance $\Delta X$ and the running deviation time $\Delta T$ are calculated with the following equations:

$$\Delta T = T - X/Vs \quad (1)$$

$$\Delta X = \Delta T \times Vs \quad (2)$$

These data showing the running distance/time deviations are displayed on the display unit associated with the navigation instrument.

FIG. 1 shows a graph schematically illustrating an example of variation of the actual running speed with respect to the average running vehicle speed Vs. As understood from FIG. 1, if the actual running speed maintained so that its value is equal to the running average vehicle velocity Vs independent of passing of time, the running distance X will increases with a linear relationship.

However, as shown in FIG. 1, the actual running speed varies with respect to the average running speed Vs. Accordingly, e.g. at a time $T = T_1$, the running deviation distance and the running deviation time are expressed as $\Delta X_1$, and $\Delta T_1$, respectively, as taught by equations (1) and (2).

Referring to FIG. 2, there is illustrated in more detail one embodiment of the conventional navigation instrument. The distance detector 10 includes a pulse generator 12 for providing a pulse every time the vehicle travels a constant distance and a first counter 14 for counting the pulse fed thereto from the pulse generator 12. The time detector 20 includes a clock pulse generator 22 including a crystal oscillator and a second counter 20 for counting the clock pulses fed thereto from the clock pulse generator 22. A scheduled speed setting unit 30 is provided for use in setting a scheduled average speed. A set switch 40 is provided for use in loading or writing the average vehicle speed set by the setting unit 30 to a first memory (which will be described soon). The outputs of the distance detector 10, the time detector 20, the speed setting unit 30 and the set switch 40 are coupled to an arithmetic unit 100. The arithmetic unit 100 comprises a first divider 51 for dividing the output (travelling distance X) from the first counter 14 by the output (travelling time T) from the second counter 24 to provide a vehicle average speed V, a second divider 52 for dividing the output (travelling distance X) from the first counter 14 by the output (average running speed Vs) of the memory 42, a subtractor 53 for subtracting the output of the second divider 52 from the output of the second counter 24 to provide a travelling time deviation $\Delta T = T - X/Vs$, and a multiplier 54 for multipling the output Vs of the memory 42 by the output ($\Delta = T - X/Vs$) of the subtractor 53 to provide a travelling distance deviation $\Delta X = \Delta T \times Vs$.

Reference numeral 60 denotes a signal selector means responsive to a data selector command from the arithmetic means 100, and sequentially outputting one of the three data signals V, $\Delta X$, and $\Delta T$ from the arithmetic means 100.

In more detail, the signal selector means 60 comprises a multiplexor 62 and a selecting circuit 64 producing a data select signal f in accordance with the data selector command. The multiplexor 62 sequentially outputs one of the three data signals V, $\Delta X$, and $\Delta T$ fed thereto as parallel inputs in accordance with the data select signal f.

Reference numeral 70 denotes a display unit 70 such as comprised of 7-segment digit indicator. The display unit 70 indicates the contents represented by the signal fed from the signal selector means 60.

In operation, before the vehicle stars, the set switch 40 is switched on. Thus, the first counter 14 and the second counter 24 are resetted. At the same time, the data showing the average running vehicle velocity set by the setting unit 30 is stored in the memory 42. When the vehicle starts, the first counter 14 counts pulses produced every time the vehicle advances for a constant distance, and producing an output signal showing the running distance X of the vehicle from a starting point. The second counter 24 counts the time reference pulses produced at a constant interval, and producing an output signal showing the running time of the vehicle from a starting point. These outputs X and T of the first and second counters are fed to the first divider 51. Thus, a data showing an average time X/Vs is obtained. This average time data X/Vs and the time data T are applied to the subtractor 53. Thus, the running deviation time $\Delta T = T - X/Vs$ is obtained. On the other hand, the output $\Delta T$ of the subtractor 53 and the running average vehicle velocity Vs from the memory 42 are fed to the multiplier 54. Thus, a data $\Delta X = \Delta T \cdot Vs$ showing a running deviation distance is obtained as an output of the multiplier 54.

These data V, $\Delta T$ and $\Delta X$ are fed to the multiplexer 62. The multiplexor 62 selectively supplies each data V, $\Delta T$ and $\Delta X$ to the display unit 70 in accordance with the data select signal f of the selecting circuit 64. Thus, these data V, $\Delta T$ and $\Delta X$ are displayed on the display unit 70.

It is here noted that the arithmetic means 100 and the signal selector means 60 may be composed by digital or analogue circuit.

However, with the conventional navigation instrument, when the average running vehicle veloity is newly set, the stored information in the first and second counters 14 and 24 is cleared by the set operation of the set switch 40. As a result, the data showing the running deviation distance $\Delta T$ and the running deviation time $\Delta T$ at the time lapse when the average running vehicle velocity is altered.

For instance, at a rally race, it is required that the driver drives the vehicle so that the vehicle runs at a corresponding designated speed over a plurality of designated speed section. In such a case, with the conventional navigation instrument, it is necessary for the driver to take a note of the data showing the running deviation distance and the running time every running section. When the driver wants to find the accumulated deviation data at the present time, it is necessary for the driver to calculate the accumulated deviation data on the basis of each data described in the note and the data indicated on the display unit. These manual calculation for the accumulated deviation data will be considerably troublesome for the driver.

SUMMARY OF THE INVENTION

With the above in mind, one object of the present invention is to provide an improved navigation instrument which makes it possible to calculate and display the travelling distance/time deviation accumulated value when the average speed of the vehicle is altered on the way of the vehicle travelling.

Another object of the present invention is to provide an improved navigation instrument wherein an arithmetic means includes travelling distance/time deviation accumulating means for adding the deviation of the travelling distance/time with respect to the average speed initially set to the deviations of the travelling distance/time appearing whenever the average speed is altered, thereby making it possible for the driver to easily recognize the accumulated deviation data.

BRIEF DESCRIPTION OF THE DRAWINGS

The following explanation of several preferred embodiments of the present invention will help in understanding thereof, when taken in conjunction with the accompanying drawings, which, however, should not be taken as limiting the present invention in any way, but which are given for purposes of illustration only. In the drawings, like parts are denoted by like reference numerals in the drawings, in which.

DESCRIPTION OF THE PREFERRED EMBODIMENTS

Figure 1:
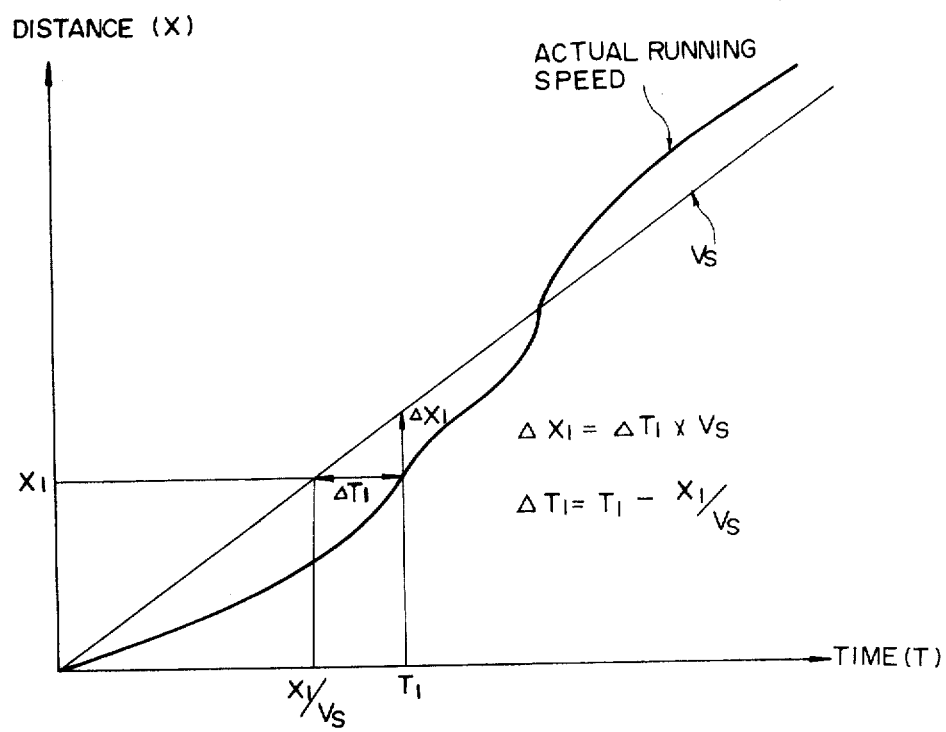
FIG. 1 is a graph illustrating variation of the actual running speed with respect to the average running vehicle speed, and how to find the travelling distance/time deviation.
Figure 2:
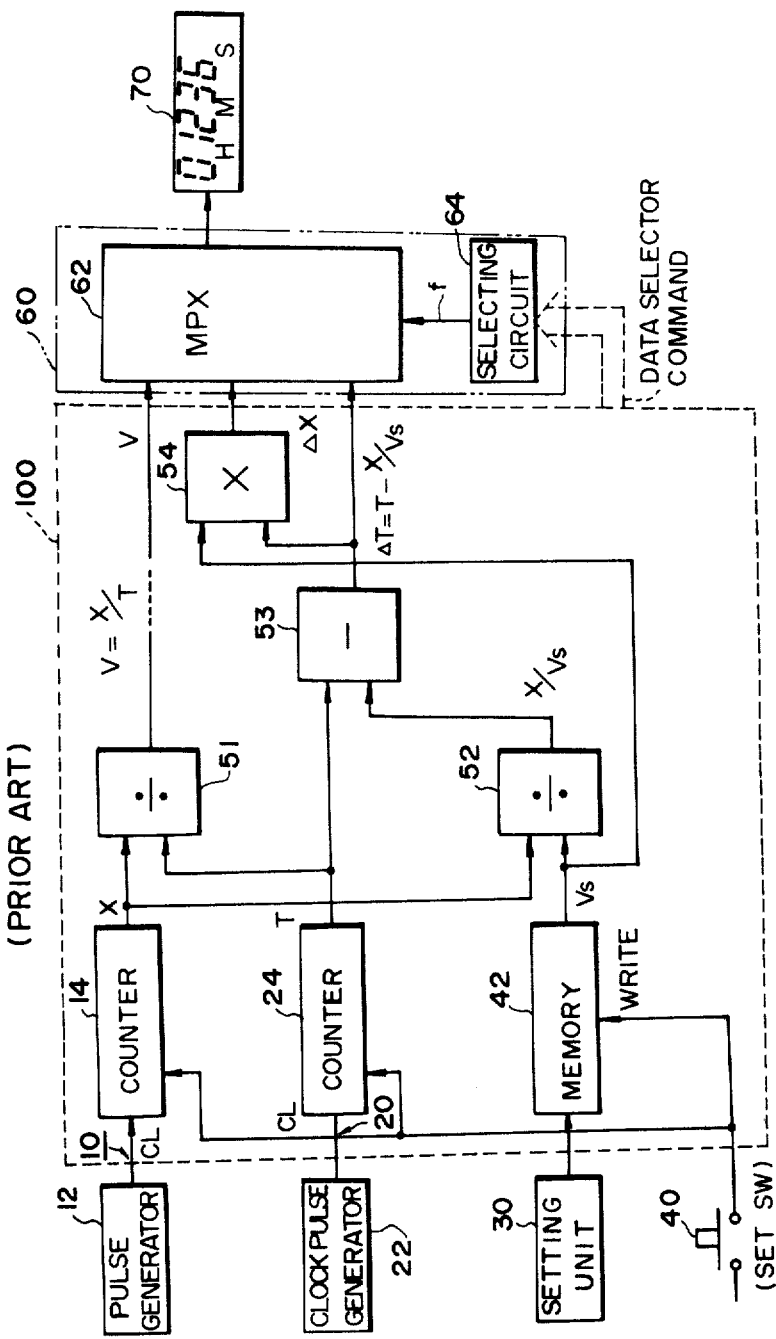
FIG. 2 is a block diagram schematically illustrating the basic structure of the conventional navigation instrument.
Figure 3:
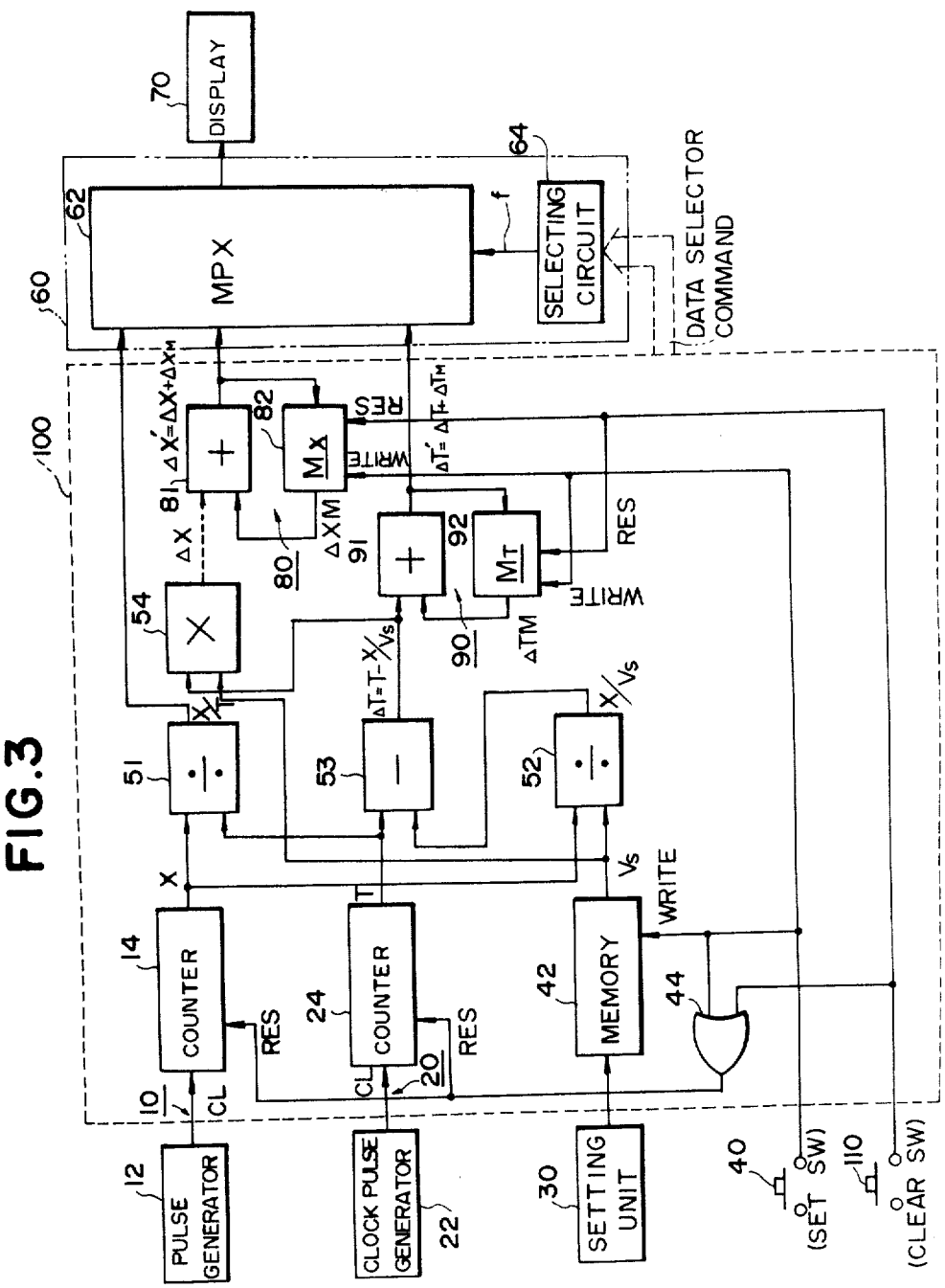
FIG. 3 is a block diagram schematically illustrating the basic structure of the present invention.

Referring to FIG. 3, there is illustrated in block diagram form one embodiment of the navigation instrument according to the present invention. An explanation in respect of the same or similar parts shown in FIG. 2 will be omitted.

Main feature of FIG. 3 circuit construction resides in as follows;

The arithmetic means 100 comprises a travelling distance deviation accumulating means 80 for adding the deviation of the travelling distance with respect to the average speed initially set by the setting unit 30 to the deviations of the travelling distance whenever the average speed is altered, and feed data showing the accumulated deviation of the travelling distance to the display unit 70 through the signal selector means 60.

The arithmetic means 100 further comprises a travelling time deviation accumulating means 90 for adding the deviation of the travelling time with respect to the average speed initially set by said setting unit to the deviations of the travelling distance whenever the average speed is altered, and feeding data showing the accumulated deviation of the travelling time to the display unit 70 through the signal selector means 60.

In the embodiment, the navigation instrument according to the present invention is provided with a clear switch 110 in addition to the set switch 40.

Reference is now made to the detail of the travelling distance deviation accumulating means 80.

The travelling distance deviation accumulating means 80 comprises a first adder 81 and a second memory 82 connected with each other. In more detail, the first adder 81 is provided with an input terminal to which a travelling distance deviation $\Delta X$ fed from the multiplier 54 is supplied, and the other input terminal to which a storage data stored in the second memory 82 is supplied. As seen from FIG. 3, the second memory 82 is placed in write-enable condition when the set switch 40 is switched on. The storage data stored in the second memory 82 is cleared when the clear switch 110 is switched on. It is to be noted that the storage data being stored in the second memory 82 is not outputted to the input of the first adder 81 until the average vehicle velocity Vs is altered.

Similarly, reference is made to the detail of the travelling time deviation accumulating means 90.

The travelling time deviation accumulating means 90 comprises a second adder 91 and a third memory 92 connected with each other. In more detail, the second adder 91 is provided with an input terminal to which a travelling time deviation $\Delta T$ fed from the subtractor 53 is supplied, and the other input terminal to which a storage data stored in the third memory 92 is supplied. Similarly to the second memory 82, the third memory 92 is placed in write-enable condition when the set switch 40 is switched on. The storage data stored in the third memory 92 is cleared when the clear switch 110 is switched on. It is to be noted that the storage data being stored in the third memory 92 is not outputted to the input of the second ader 91 until the average vehicle velocity Vs is altered.

Further, as will be understood from the operation of the navigation instrument of the invention, the first and second counters 14 and 24 are resettable by logical-OR outputs of the set switch 40 and the clear switch 110. For this purpose, an OR gate 44 is provided in the arithmetic means 100.

Figure 4:
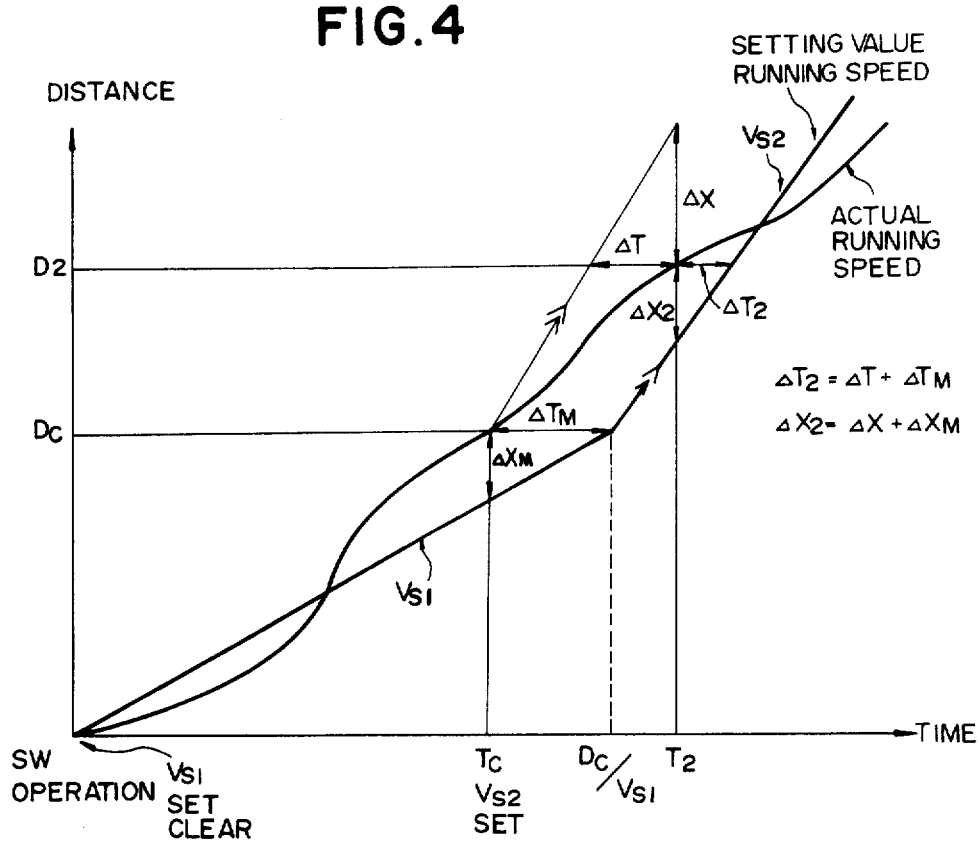
FIG. 4 is a graph similar to FIG. 1, which illustrates how to find the accumulated distance/time deviation when the average speed of the vehicle is altered with the navigation instrument according to the present invention.

The operation of the navigation instrument according to the present invention will be described with reference to the FIG. 3 circuit construction and a graph shown in FIG. 4.

At a starting point, the value $Vs_1$ initially set by the setting unit 30 is stored into the memory 42 by switching on the set switch 40. At the same time or afterward, the clear switch 110 is switched on. Thus, each content of the first and second counters 14 and 24 is cleared. Further, by responding to the operation of the clear switch 110, the contents of the second and third memories 82 and 92 are cleared. Furthermore, in accordance with the operation of the set switch 40, the second and third memories 82 and 92 are placed in write-enable condition.

When the vehicle starts after the initializing operation is accomplished, the first and second counters 14 and 24 begin to count up the data showing the travelling distance and time, respectively. As understood from the explanation in regard to the conventional navigation instrument shown in FIG. 2, the multiplier 54 and the subtractor 53 output the travelling deviation distance $\Delta X$ and the travelling deviation time $\Delta T$, respectively. These data showing the travelling deviation distance/time are selectively displayed on the display unit 70 through the multiplexor 60.

Assuming now that another average vehicle velocity $V_{s2}$ is newly set to the setting unit 30 by operating the set switch 40 at a time Tc. As seen from an actual running speed shown in FIG. 4, the travelling distance at a time Tc is expressed as Dc. The running deviation time $\Delta Tm = Tc - Dc/V_{s1}$ and the running deviation distance $\Delta Xm = \Delta T \times V_{s1}$ at the time when the average vehicle speed is altered from $V_1$ to $V_2$ are stored in the memories 92 and 82, respectively. At the same time, the content of the counters 14 and 24 are cleared. From this time, new deviation measuring is carried out on the basis of the newly set average vehicle velocity $V_{s2}$. Accordingly, when the running time is $T_2$, the running deviation time $\Delta T_2 = (T_2 - Tc) - (D_2 - Dc)/V_{s2} + \Delta Tm$ and the running deviation distance $\Delta X_2 = \{(T_2 - Tc)V_{s2} - (D_2 - Dc)\} + \Delta Tm$ are outputted from the adders 81 and 83. The data obtained by accumulated deviations appearing before the running average vehicle velocity is altered are displayed on the display unit 70.

Figure 5:
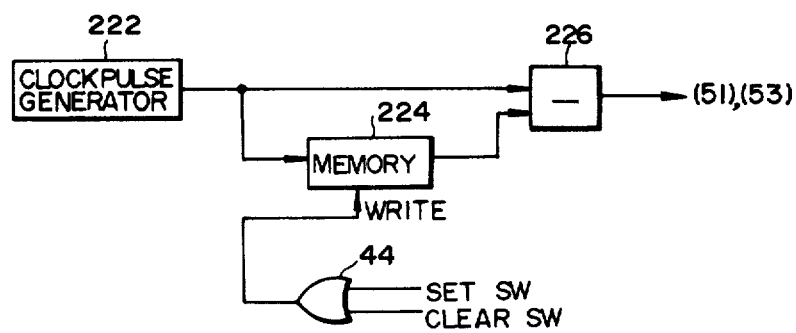
FIG. 5 is a modification of a circuit construction employed instead of a clock pulse generator and a second counter shown in FIG. 3.

Referring to FIG. 5, there is illustrated a modification of a circuit construction employed instead of a clock pulse generator 22 and a second counter 24 shown in FIG. 3.

In more detail, the circuit construction according to this example comprises a clock pulse generator 222, and a subtractor 226 having an one input terminal directly connected to the output terminal of the clock pulse generator 222 and the other input terminal connected to the output terminal of the clock pulse generator 222 through a memory 224. The memory 224 is placed in write-enable condition by logical-OR output of the set switch 40 and the clear switch 110. With the above circuit construction, the time when any one of the set switch 40 and the clear switch 110 is switched on is stored in the memory 224. Accordingly, it is possible to calculate the passing time from the difference between the present time given by clock pulse generator 222 and the output of the memory 224.

While the present invention has been shown and described with reference to some preferred embodiments thereof, and with reference to the drawings, it should be understood that various changes and modifications may be made to the form and the detail thereof, by one skilled in the art, without departing from the scope of the present invention. Therefore, it should be understood by all those whom it may concern that the shown embodiments, and the drawings, have been given for the purposes of illustration only, and are not intended to limit the scope of the present invention, or of the protection sought to be granted by Letters Patent, which are solely to be defined by the accompanying claims.

What is claimed is:

1. In a navigation instrument for use with a road way vehicle, comprising:
    (a) distance detector means producing a signal showing the distance of travel of the vehicle from a starting point;
    (b) time detector means producing a signal showing the length of time it takes the vehicle to travel said distance;
    (c) speed setting means producing a signal showing a scheduled average speed;
    (d) arithmetic means responsive to said vehicle travelling distance and time showing signals and said scheduled average speed showing signal, and producing three data signals showing the average speed of the vehicle, the deviation of the travelling distance from a scheduled one, and the deviation of the travelling time from a scheduled one;
    (e) signal selector means responsive to a data selector command from said arithmetic means, and sequentially outputting one of said three data signals from said arithmetic means;
    (f) display means responsive to each signal applied thereto from said signal selector means for displaying the content represented by the signal,
    the improvement wherein said arithmetic means includes
    (i) travelling distance deviation accumulating means for adding the deviation of the travelling distance with respect to the average speed initially set by said setting means to the deviations of the travelling distance whenever said average speed is altered, and means for feeding data showing the accumulated deviation of the travelling distance to said display means through said signal selector means; and
    (ii) travelling time deviation accumulating means for adding the deviation of the travelling time with respect to the average speed initially set by said setting unit to the deviations of the travelling time whenever said average speed is altered, and means for feeding data showing the accumulated deviation of the travelling time to said display means through said signal selector means.

2. A navigation instrument for use with a roadway vehicle as defined in claim 1, wherein said arithmetic means further comprises a first counter for counting the pulses fed from said distance detector, said distance detector comprising a pulse generator for providing a pulse every time the vehicle travels a constant distance.

3. A navigation instrument for use with a roadway vehicle as defined in claim 2, wherein said arithmetic means further comprises a second counter for counting the pulses fed from said time detector means, said time detector comprising a clock pulse genrator.

4. A navigation instrument for use with a road way vehicle as defined in claim 1, which further comprises a set switch for loading the value set by said setting means into said arithmetic means.

5. A navigation instrument for use with a road way vehicle as defined in claim 4, wherein said arithmetic means further comprises a first memory in which the average speed set by said speed setting means is stored when said set switch is switched on.

6. A navigation instrument for use with a roadway vehicle as defined in claim 3, which further comprises a clear switch for clearing said travelling distance and time accumulating means and a set switch for loading the value set by said setting means into said arithmetic means.

7. A navigation instrument for use with a road way vehicle as defined in claim 6, wherein said first and second counters are reset by a logical-OR output of said set switch and said clear switch.

8. A navigation instrument for use with a roadway vehicle as defined in claim 7, wherein said travelling distance deviation accumulating means comprises a first adder having one input terminal to which data showing the deviation of the travelling distance with respect to the average speed initially set by said setting means is fed, and the other input terminal to which storage data stored in a memory is fed, said memory being connected to the output terminal of said first adder while the output terminal thereof is connected to the input terminal of said first adder, said memory being connected to be reset by said clear switch and write-enabled by said set switch.

9. A navigation instrument for use with a roadway vehicle as defined in claim 7, wherein said travelling time deviation accumulating means comprises an adder having one input terminal to which data showing the deviation of the travelling time with respect to the average speed initially set by said setting means is fed, and the other input terminal to which storage data stored in a memory is fed, said memory being connected to the input terminal of said adder while the output terminal thereof is connected to the input terminal of said adder, said memory being connected to be reset by said clear switch and write-enabled by said set switch.

10. A navigation instrument for use with a roadway vehicle comprising:
  a distance detector means producing a signal showing the distance of travel of the vehicle from a starting point;
  a time detector means producing a signal showing the length of time it takes the vehicle to travel said distance;
  speed setting means producing a signal showing a scheduled average speed;
  arithmetic means responsive to said vehicle travelling distance and time showing signals and said scheduled average speed showing signal, and producing three data signals showing the average speed of the vehicle, the deviation of the travelling distance from a scheduled one, and the deviation of the travelling time from a scheduled one;
  travelling distance deviation accumulating means incorporated with said arithmetic means for adding the deviation of the travelling distance with respect to the average speed initially set by said setting means to the deviations of the travelling distance whenever said average speed is altered, and said travelling distance deviation accumulating means incorporating a means for feeding data showing the accumulated deviation of the travelling distance to be displayed;
  signal selector means responsive to a data selector command from said arithmetic means, and sequentially outputting one of said three data signals from said arithmetic means; and
  display means responsive to each signal applied thereto from said signal selector means for displaying the content represented by the signal.

11. A navigation instrument for use with a roadway vehicle comprising:
  a distance detector means producing a signal showing the distance of travel of the vehicle from a starting point;
  a time detector means producing a signal showing the length of time it takes the vehicle to travel said distance;
  speed setting means producing a signal showing a scheduled average speed;
  arithmetic means responsive to said vehicle travelling distance and time showing signals and said scheduled average speed showing signal, and producing three data signals showing the average speed of the vehicle, the deviation of the travelling distance from a scheduled one, and the deviation of the travelling time from a scheduled one;
  travelling time deviation accumulating means incorporated with said arithmetic means for adding the deviation of the travelling time with respect to the average speed initially set by said setting means to the deviations of the travelling time whenever said average speed is altered, and said travelling time deviation accumulating means incorporating a means for feeding data showing the accumulated deviation of the travelling distance to be displayed; and
  signal selector means responsive to a data selector command from said arithmetic means, and sequentially outputting one of said three data signals from said arithmetic means.

12. A navigation instrument for use with a roadway vehicle as defined in claim 10, wherein said arithmetic means further comprises a first counter for counting the pulse fed from said distance detector, said distance detector comprising a pulse generator for providing a pulse every time the vehicle travels a constant distance.

13. A navigation instrument for use with a roadway vehicle as defined in claim 11, wherein said arithmetic means further comprises a counter for counting the pulses fed from said time detector means, said time detector means comprising a clock pulse generator.

14. A navigation instrument for use with a roadway vehicle as defined in claim 10 or 11, which further comprises a set switch for loading the value set by said setting means into said arithmetic means.

15. A navigation instrument for use with a roadway vehicle as defined in claim 14, wherein said arithmetic means further comprises a memory in which the average speed set by said speed setting means is stored when said set switch is switched on.

16. A navigation instrument for use with a roadway vehicle as defined in claim 10 or 11, which further comprises a clear switch for clearing the accumulating means.

17. A navigation instrument for use with a roadway vehicle as defined in claim 12, including a clear switch for clearing the accumulating means and a set switch for loading the value set by said setting means into said arithmetic means wherein said first counter is reset by a logical-OR output of said set switch and said clear switch.

18. A navigation instrument for use with a roadway vehicle as defined in claim 13, including a clear switch for clearing the accumulating means and a set switch for loading the value set by said setting means into said arithmetic means, wherein said counter is reset by a logical-OR output of said set switch and said clear switch.

19. A navigation instrument for use with a roadway vehicle as defined in claim 17, and wherein said travelling distance deviation accumulating means comprises an adder having one input terminal to which data showing the deviation of the travelling distance with respect to the average speed initially set by said setting means is fed, and a second input terminal to which storage data stored in a memory is fed, said memory being connected to the output terminal of said adder while the output terminal of said memory is connected to the second input terminal of said adder, said memory being connected to be reset by said clear switch and write-enabled by said set switch.

20. A navigation instrument for use with a roadway vehicle as defined in claim 18 wherein said travelling time deviation accumulating means comprises an adder having one input terminal to which data showing the deviation of the travelling time with respect to the average speed initially set by said setting means is fed, and a second input terminal to which storage data stored in a memory is fed, said memory being connected to the input terminal of which is connected to the output terminal of said adder while the output terminal thereof is connected to the second input terminal of said adder, said memory being connected to be reset by said clear switch and write enabled by said set switch.

* * * * *